(12) United States Patent
Zavaglia et al.

(10) Patent No.: US 6,896,413 B2
(45) Date of Patent: May 24, 2005

(54) BEARING UNIT FOR THE HUB OF A VEHICLE WHEEL EQUIPPED WITH A TIRE INFLATING SYSTEM

(75) Inventors: Luca Zavaglia, Rivoli (IT); Michele Musso, Rosta (IT); Andreas Ruetter, Pinerolo (IT); Marco Brunetti, Turin (IT)

(73) Assignee: SKF Industrie S.p.A., Turin (IT)

( * ) Notice: Subject to any disclaimer, the term of this patent is extended or adjusted under 35 U.S.C. 154(b) by 62 days.

(21) Appl. No.: 10/446,915

(22) Filed: May 27, 2003

(65) Prior Publication Data

US 2003/0235358 A1 Dec. 25, 2003

(30) Foreign Application Priority Data

May 31, 2002 (IT) ..................... TO2002A0463

(51) Int. Cl.$^7$ .................... F16C 33/78; B60C 23/00
(52) U.S. Cl. ................ 384/484; 152/417; 384/477; 384/544
(58) Field of Search ................ 384/477, 484, 384/544, 589; 152/417

(56) References Cited

U.S. PATENT DOCUMENTS

| | | | | |
|---|---|---|---|---|
| 4,730,656 A | * | 3/1988 | Goodell et al. ............. | 384/544 |
| 4,733,707 A | * | 3/1988 | Goodell et al. ............. | 152/417 |
| 4,844,138 A | * | 7/1989 | Kokubu ..................... | 152/417 |
| 4,932,451 A | * | 6/1990 | Williams et al. ............ | 152/417 |
| 5,080,157 A | * | 1/1992 | Oerter ....................... | 384/484 |
| 5,503,480 A | | 4/1996 | Caillaut et al. | |
| 6,199,611 B1 | * | 3/2001 | Wernick ..................... | 152/417 |

FOREIGN PATENT DOCUMENTS

| | | |
|---|---|---|
| DE | 3738529 | 10/1988 |
| EP | 656 267 | 1/1996 |
| EP | 713 021 | 5/1996 |
| FR | 2714943 | 7/1995 |

* cited by examiner

Primary Examiner—Thomas R. Hannon
(74) Attorney, Agent, or Firm—Merchant & Gould P.C.

(57) ABSTRACT

A bearing unit comprises an outer stationary race (1) with a first inner passage (6) for the air, and two axially adjacent inner half-races (2a, 2b) rotatable with the hub of a wheel. Formed between the inner half-races are essentially radial second inner air passages (7, 71, 72). These passages have surfaces (71d, 72d) inclined forwardly with respect to a direction of rotation (A, B) so as to favor the air flow through the rotating part of the bearing.

17 Claims, 3 Drawing Sheets

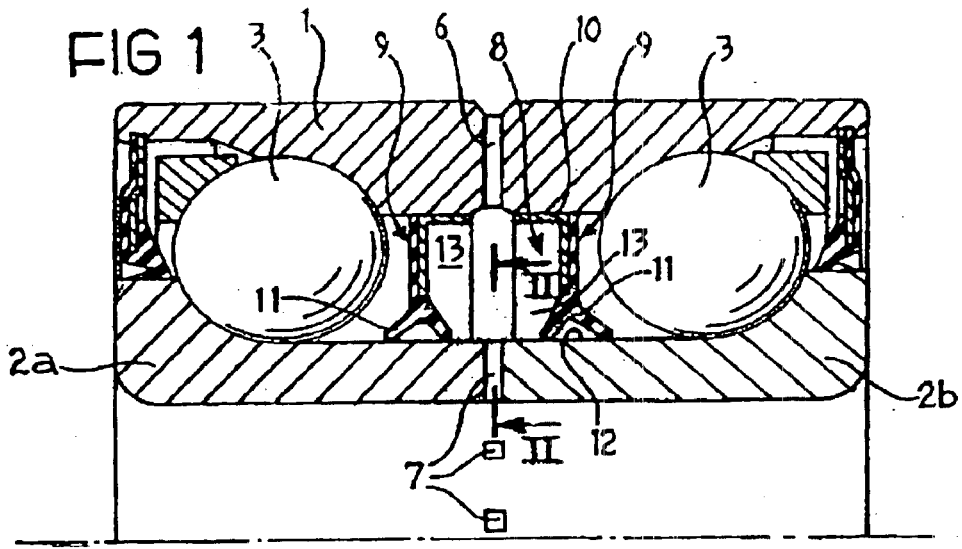
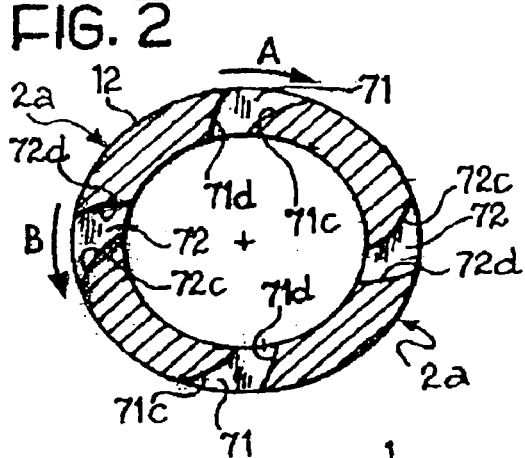
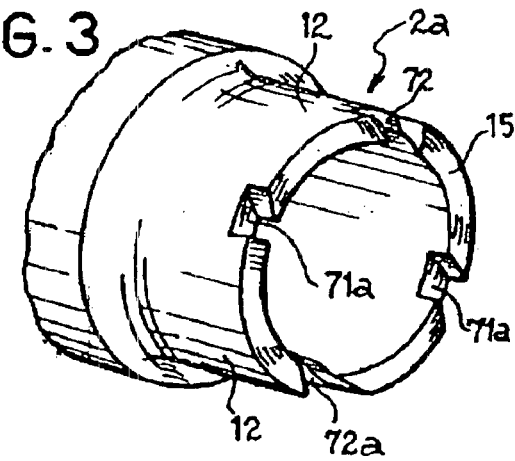
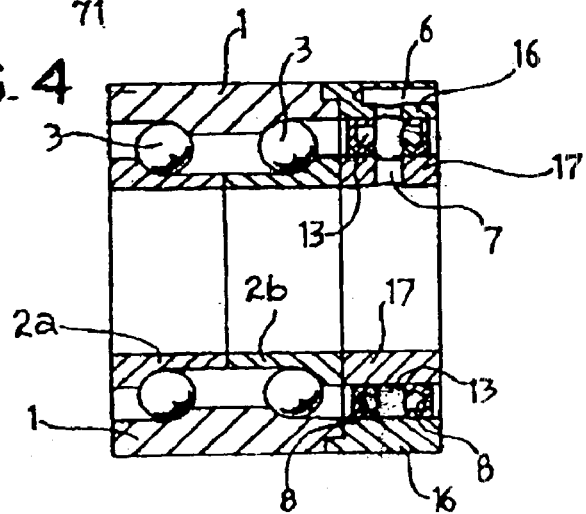

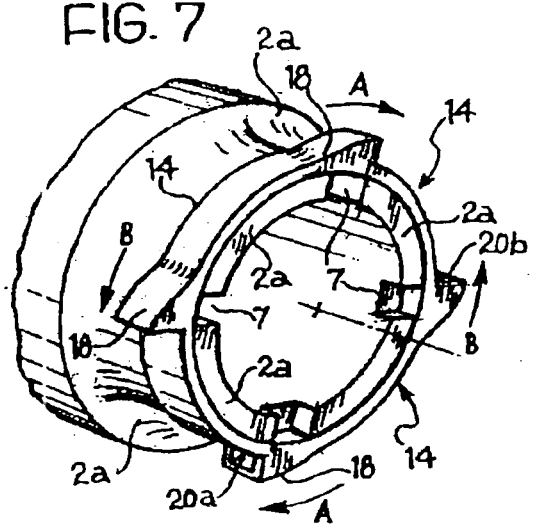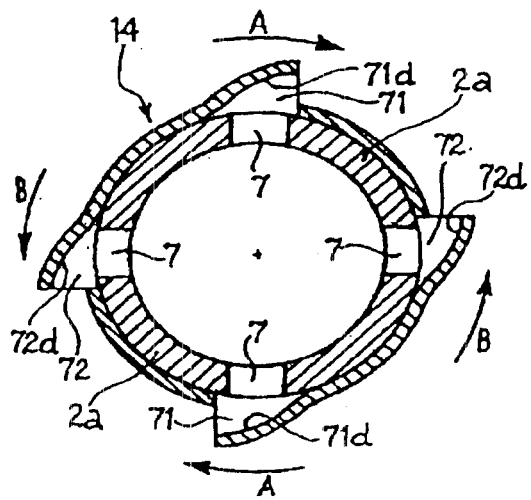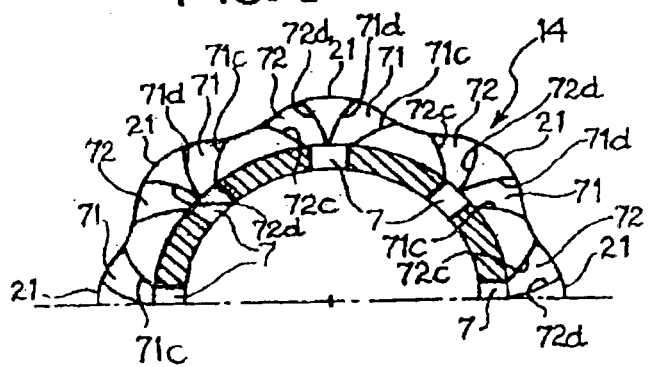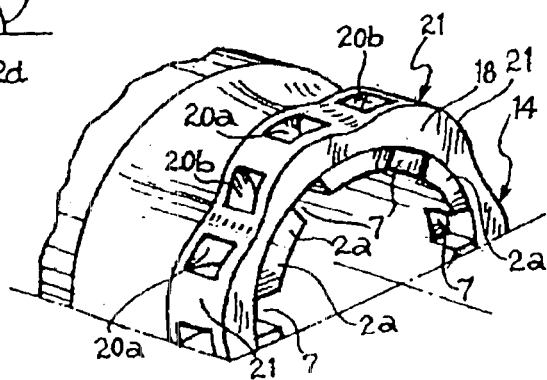

BEARING UNIT FOR THE HUB OF A VEHICLE WHEEL EQUIPPED WITH A TIRE INFLATING SYSTEM

The present invention refers to a bearing unit for the hub of a vehicle wheel equipped with an on-board tyre inflating system.

There are known bearing units for a vehicle wheel hub provided with special vents and sealing devices for blowing into the tyre air pressurized by a source of pressurized air mounted on board of the vehicle. Hub-bearing unit of this kind, known for example from EP-713 021, EP-656 267, U.S. Pat. No. 5,503,480, DE-37 38 529, FR-2 714 943, allow to adjust and/or monitor the air pressure in the tyres.

The cited documents disclose bearing units for the hub of a vehicle wheel comprising a non-rotating outer race housed in a cylindrical seat of the suspension standard and an inner race (usually a pair of half-races located side by side) fast for rotation with the hub. The air coming from a pressurized air source mounted on board of the vehicle is blown through special conduits obtained in the suspension standard. Radial passages are formed in the outer and inner races of the bearing for conveying air through the outer race into an intermediate annular chamber between the races and then through the inner race or half-races towards the centre of the bearing. From here, the air is conveyed through other conduits to the wheel rim and then the tyre.

It has been noted that, at high speed of rotation, the pressurized air encounters difficulties in passing through the bearing, particularly in passing from the intermediate chamber through the rotating part of the bearing.

Accordingly, the object of the present invention is to improve the air flow through the bearing, particularly through its rotating part.

This and other objects and advantages, that will be better understood herein after, are accomplished according to the invention by a bearing unit as defined in the appended claims.

The constructional and functional features of a few preferred but not limiting embodiments of a bearing unit according to the present invention will now be described, reference being made to the accompanying drawings, in which:

FIG. 1 is a schematic cross sectional view of a bearing unit according to the invention for the hub of the wheel of a vehicle equipped with a tyre inflating system;

FIG. 2 is a schematic radial cross-sectional view along the line II—II of FIG. 1;

FIG. 3 is a partial perspective view of one of the two inner half-races of the bearing unit of FIG. 1;

FIG. 4 is a schematic axial cross-sectional view of another embodiment of bearing unit according to the invention;

FIG. 6 is a schematic view in radial cross-section taken along the line VI—VI of FIG. 5;

FIG. 7 is a partial perspective view of some of the components of FIG. 6;

FIG. 8 is a schematic view in radial cross-section of a rotating half-race of the bearing with an air conveyor rotor alternative to that of FIGS. 6 and 7;

FIG. 9 is a partial perspective view of the components of FIG. 8; and

Figure 5:
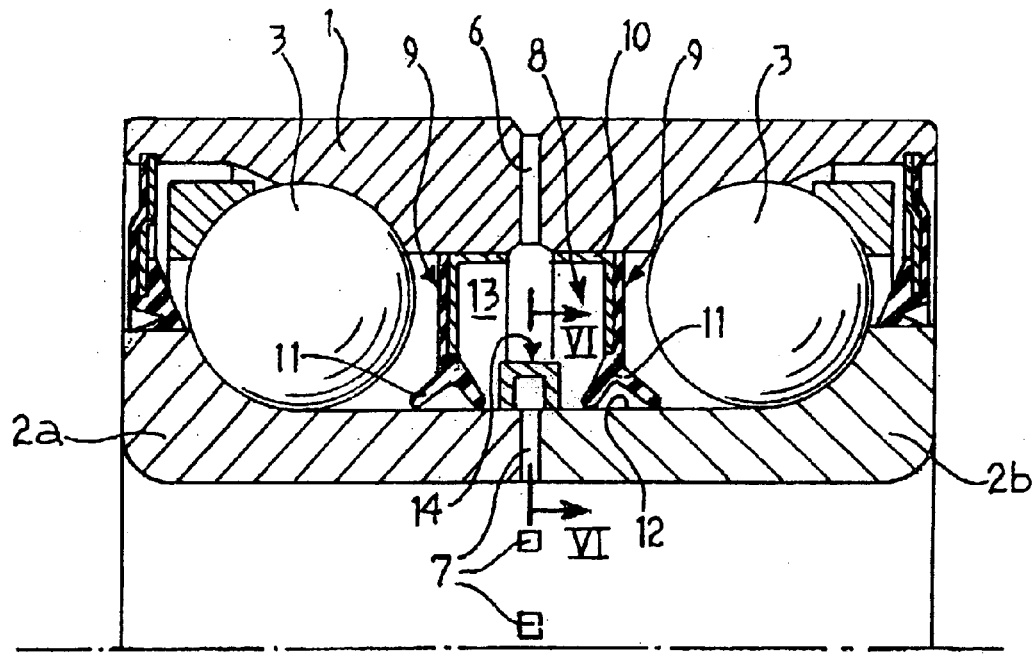
FIG. 5 is a schematic axial cross-sectional view, similar of that of FIG. 1, of a bearing unit according to a further embodiment of the invention, provided in this example with an air conveyor rotor.

With reference initially to FIG. 1, a bearing unit comprises a radially outer stationary race 1, a radially inner rotatable race 2 formed by two axially adjacent half-races 2a, 2b, and two sets of rolling balls 3 interposed between the outer race 1 and the inner races 2a, 2b. In a radial plane located between the two sets of balls 3 there are provided one or more radial passages 6 are formed through the bearing outer race 1 and one or more essentially radial passages 7 obtained through the bearing inner race 2, described in detail in the following.

In the annular space defined by the outer race 1, the inner half-races 2a, 2b and the two sets of balls 3 there is mounted a sealing device 8 of known kind, that allows the pressurized air to pass through the outer 6 and inner 7 passages of the bearing. The sealing device is constituted by two annular sealing elements 9 facing one another axially and symmetrically with respect to the radial plane in which the passages 6, 7 of the bearing unit lie. Each sealing element 9 comprises a metal reinforcement 10 on which there is moulded a flexible material, such as an elastomer, forming sealing lips 11 in sliding contact with contacts surfaces 12 of the inner half-races 2a, 2b.

The two sealing elements 9 so arranged delimit an intermediate annular chamber 13. Pressurized air coming from a source of pressurized air mounted on board of the vehicle, which may be part of an automatic system or a system controlled by the driver, passes through special ducts (not shown) formed in the suspension standard of the wheel where the bearing is housed, passes through the passage 6, into the intermediate chamber 13, through the passages 7, and from here is conveyed through other conduits (not shown) to the wheel rim and then the tyre.

As shown in FIG. 2, the inner passages 7 have a cross section progressively decreasing from the outside to the inside and are inclined forwardly with respect to the direction of rotation. Owing to this arrangement, when the inner half-races rotate fast with the hub, the inner passages 7 create a vacuum in the intermediate annular chamber 13 that favours the air flow through the rotating part of the bearing.

In the embodiment schematically illustrated in FIG. 2, the inner passages 7 comprise both inner passages 71 inclined forwardly with respect to the direction of rotation indicated by arrow A, and inner passages 72 inclined forwardly with respect to the opposite direction of rotation, indicated by the arrow B. A hub unit of this kind has the further advantage that it can be mounted indifferently on a wheel on the left or right side of the vehicle. In one case, the vacuum in chamber 13 will be provoked by the inner passages 71, and in the other case by the passages 72.

Preferably, the inner passages 7 are defined by the coupling of complementary recesses formed, according to a specular symmetry, on facing surfaces of the two inner half-races 2a, 2b. As shown in FIG. 3, the bearing half-race 2a has, on its radial side 15 facing the adjacent half-race 2b, a plurality of essential radial recesses 71a, 72a. When the two half-races are placed side by side, these recesses define with symmetrical recesses of the half-race 2b the above described inner passages 71 and 72.

For a better introduction of the air in the passages 7, the passages 71, 72 each have a surface 71d, 72d, here defined "rear" or "trailing" with reference to the direction of rotation, of concave shape with the concavity facing one of the two possible directions of rotation. To reduce turbulence, each passage 71, 72 has a respective surface 71c, 72c, here defined "leading" with reference to the direction of rotation, of convex shape with the convexity facing one of the two possible directions of rotation.

FIG. 4 shows another embodiment of the invention, wherein the air passages are not formed through the bearing races 1, 2a and 2b, but in annular elements 16, 17 adapted for mounting on one side of the bearing races. Annular elements similar to those here indicated 16, 17, but with radial straight passages of constant cross-section are described and shown in another Italian patent application to the same applicant, to which reference is made, filed on Mar. 6, 2002 under filing number TO2002A000189 and not yet available to the public at the filing date of the present patent application.

Referring to FIG. 4, where parts equal or corresponding to those already described with reference to FIGS. 1 to 3 are designated with like reference numbers, the bearing unit comprises a stationary outer annular element 16 fixed on one side of the outer race 1 and an inner annular element 17 adapted for being mounted fast for rotation to the hub (not shown) on one side of the inner half-race 2b. An inner passage formed through the outer annular element 16 is indicated 6.

Formed in the inner annular element 17 are one or more inner passages 7 having a progressively decreasing cross-section from the outside to the inside and inclined forwardly with respect to the direction of rotation. The radial cross-section (not shown) of the internal annular element 17 is similar to that of FIG. 2, of which reference is made. Also in this embodiment of the invention each of the inner passages 7 has a trailing surface with reference to one of the two possible direction of rotation, inclined forwardly with respect to the direction of rotation being considered and preferably curved with a concavity facing said direction of rotation. Between the annular elements 16 and 17 there is mounted a sealing device 8 defining an intermediate annular chamber 13 communicating with the passages 6 and 7 to allow the passage of pressurized air in a manner similar to what described with reference to FIGS. 1 to 3.

Referring now to FIGS. 5, 6 and 7, according to another embodiment of the invention, fitted on the rotating half-races 2a, 2b is an air conveyor rotor 14 of annular shape with a plurality of passages 71, 72 each having a surface 71d, 72d radially protruding in the intermediate annular chamber 13. Each surface 71d, 72d is inclined forwardly with respect to one of the two possible directions of rotations. The surfaces 71d, 72d are each disposed in proximity of one of the passages 7 formed in the rotating half-races 2a, 2b and extend from an edge of the passage (here defined "trailing" edge with reference to a direction of rotation) towards the outside and forwardly in such a direction of rotation. Owing to this arrangement, when the inner half-races rotate fast with the hub, the inclined surfaces capture the air in the intermediate chamber 13 and convey it into the passageways 7 formed through the rotating part of the bearing.

Also in this embodiment, as shown schematically in FIG. 6 and 7, there are provided both surface 71d inclined forwardly with respect to the direction of rotation indicated by arrow A, and surfaces 72d inclined forwardly with respect to the opposite direction of rotation, indicated by arrow B. A bearing unit fitted with an air conveyor rotor of this kind has the further advantage that it can be indifferently mounted to a wheel on the left or right side of a vehicle. In one case, when the direction of rotation is that indicated by arrow A, the air will be captured in chamber 13 by the surfaces 71d, and, in the other case, by the surfaces 72d. To improve the capturing of air to be conveyed through the bearing, the inclined surfaces 71d, 72d are preferably curved with a concavity facing one of the two possible directions of rotations.

In the example of FIGS. 6 and 7, the air conveyor rotor 14 forms a pair of side surfaces 18 located at the sides of each inclined surface 71d, 72d, whereby the rotor has two sets of air inlets 20a, 20b alternately facing opposite tangential directions along the perimeter of the rotor.

In the example of FIGS. 8 and 9, the rotor 14 has a peripheral undulated or multi-lobed shape. At each lobe 21 there is formed a pair of surfaces 71d, 72d inclined forwardly with respect to opposite directions of rotations and curved with concavities facing opposite directions. The pairs of inclined surfaces in each lobe are part of a respective pair of passages 71, 72 that converge so as to face and communicate with one of the passages 7 in the rotating race of the bearing. Each of the passages 71, 72 a cross-section progressively decreasing from the outside to the inside and is inclined forwardly with respect to a direction of rotation opposite to that of the other passage of the pair. The passages 71, 72 open on the peripheral surface of the rotor forming air inlets 20a, 20b facing opposite directions (FIG. 9).

Upon rotating with the rotatable part of the bearing, the rotor 14 captures air from the intermediate chamber 13 through the air inlets 20a (or 20b according to the direction of rotation). The inclined surfaces 71d (or 72d) convey air into the passages 7 formed through the rotating part of the bearing. The progressively decreasing cross-section of the passages 71, 72 is advantageous in that it generates a vacuum in the intermediate annular chamber 13 that favours the air flow through the rotating part of the bearing.

Similarly to what is shown in FIG. 2, also in the example of FIGS. 8 and 9 in each passage 71, 72 the surface 71c, 72c, here defined "leading" with reference to the direction of rotation being considered has a convex shape to reduce turbulence. For a better introduction of air in the passages 7, the "trailing" surface 71d, 72d, which serves to capture the air, is instead curved with a concavity facing the direction of rotation. It is to be noted that in the examples of FIGS. 6 to 9, the passages 7 formed through the rotating part of the bearing may be radial and straight. Still according to the invention, it is also possible to associate an air conveyor rotor of the type indicated 14 with a bearing unit with inclined inner passages as shown in FIGS. 2 to 4.

Figure 10:
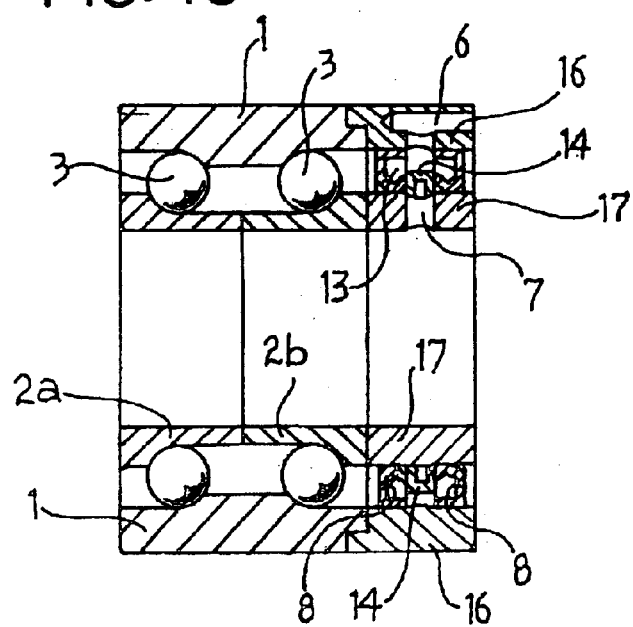
FIG. 10 is a schematic axial cross-sectional view of a further and still different embodiment of a bearing unit according to the invention.

In FIG. 10 there is shown another embodiment of the invention, in which the air passages are not formed through the bearing races 1, 2a and 2b, but in a device comprised of annular elements 16, 17 adapted for being mounted to a side of the bearing races, similarly to what is shown in FIG. 4. The bearing unit of FIG. 10 includes a stationary outer annular element 16 fixed to a side of the outer race 1 and an inner annular element 17 adapted for being mounted fast for rotation to the hub (not shown) on one side of the inner half-race 2b. An inner passage formed through the outer annular element 16 is indicated 6. Formed in the inner annular element 17 are one or more inner radial passages 7. Between the annular element 16 and 17 there is mounted a sealing device 8 defining an intermediate annular chamber 13 communicating with the passages 6 and 7 to allow the passage of pressurized air through the annular elements 16 and 17.

An air conveyor rotor 14 is fitted onto the inner rotatable annular element 17 in a manner similar to what has already been described in FIGS. 5 to 9. Also in this embodiment of the invention, when the inner annular element is rotating, the inclined surfaces of the rotor 14 capture air from the intermediate chamber 13 and convey it into passages 7 formed through the rotating annular element.

It is to be understood that the invention is not limited to the embodiments here described and illustrated, which are to be considered as examples of a bearing unit according to the invention. The invention is likely to undergo modifications as to shape and location of parts, constructional and functional details, and materials employed. For example, the bearing units here shown are units of the so-called first generation. However, reference to this possible field of use should not in any way be interpreted as limiting the scope of the patent, as the invention is equally applicable to bearing units of the so-called second or third generation with flanges races.

In addition, those skilled in the art will recognize that the invention is equally applicable to bearing units in which the outer race is rotatable and the inner race is stationary.

Finally, the section of the second passages 7, 71, 72 may take any shape, for example polygonal, (as shown in FIG. 3) or curved.

What is claimed is:

1. A bearing unit for a wheel hub of a vehicle equipped with a system for supplying pressurized air to a tyre through the hub of the wheel, of the type in which the bearing unit comprises:

a first stationary annular element (1, 16) with at least a first inner air passage (6), at least a second rotatable annular element (2a, 2b; 17) with at least a second essentially radial inner air passage (7, 71, 72), an intermediate annular chamber (13) between the first (1, 16) and the second (2a, 2b; 17) annular elements; characterised in that said at least one second passage (7, 71, 72) has a surface (71d, 72d) inclined forwardly with respect to a direction of rotation (A, B) so as to favour the air flow from the intermediate annular chamber (13) through the second passage (7, 71, 72).

2. A bearing unit according to claim 1, wherein said at least one second passage (7, 71, 72) has a cross-section progressively decreasing in a radial direction away from the first stationary annular element and that said second passage is inclined forwardly with respect to a direction of rotation (A, B).

3. A bearing unit according to claim 2, wherein:

the first annular element (1, 16) is radially outer, the second annular element (2a, 2b; 17) is radially inner and adapted for being mounted fast for rotation to a wheel hub, and said at least one second inner passage (7, 71, 72) has a cross-section progressively decreasing from the outside towards the inside.

4. A bearing unit according to claim 1, wherein:

the first annular element (1, 16) is radially outer;

the second annular element (2a, 2b; 17) is radially inner and is adapted for being mounted fast for rotation with a wheel hub.

5. A bearing unit according to claim 4, wherein at least one of said second inner passages (7, 71, 72) is defined by at least a recess (71a, 72a) formed in at least one of two facing surfaces (15) of two adjacent radially inner half-races (2a, 2b) of the bearing unit.

6. A bearing unit according to claim 5, wherein at least one of said second inner passages (7, 71, 72) is defined by a pair of complementary recesses formed in respective facing surfaces (14) of two adjacent radially inner half-races (2a, 2b) of the bearing unit.

7. A bearing unit according to claim 6, wherein the complementary recesses formed in the two inner half-races (2a, 2b) are specular.

8. A bearing unit according to claim 1, comprising a plurality of said inclined surfaces (71d, 72d), at least one (71d) of which is inclined forwardly with respect to a first direction of rotation (A), and at least another (72d) of which is inclined forwardly with respect to a second direction of rotation (B) opposite to the first direction (A).

9. A bearing unit according to claim 1, wherein said inclined surface (71d, 72d) is curved and concave with a concavity facing the same direction of rotation towards which said surface is forwardly inclined.

10. A bearing unit according to claim 9, wherein in at least one of said second passages (7, 71, 72) the inclined and concave surface (71d, 72d) is facing an opposite curved and convex surface (71c, 72c).

11. A bearing unit according to claim 1, wherein said at least one inclined surface (71d, 72d) is formed by an air conveyor rotor (14) of essentially annular shape fast for rotation with the second rotatable annular element (2a, 2b; 17).

12. A bearing unit according to claim 11, wherein the air conveyor rotor (14), forms lateral surfaces (16) at the sides of each inclined surface (71d, 72d), whereby the rotor has radially oriented air inlets (20a, 20b).

13. A bearing unit according to claim 12, wherein the air inlets (20a, 20b) are facing alternate opposite tangential directions along the perimeter of the rotor.

14. A bearing unit according to claim 11, wherein the air conveyor rotor (14) has a peripheral undulated or multi-lobed shape, where in each lobe (21) there is formed a pair of said surfaces (71d, 72d) inclined forwardly with respect to opposite directions of rotations and curved with concavities facing opposite directions of rotation (A, B).

15. A bearing unit according to claim 14, wherein the pairs of inclined surfaces (71d, 72d) are part of respective pairs of passages (71, 72), where the two passages of each pair open onto the peripheral surface of the rotor forming air inlets (20a, 20b) facing opposite directions of rotation (A, B).

16. A bearing unit according to claim 15, wherein the passages of each pair of passages (71, 72) converge so as to face and communicate with one of the passages (7) in the second rotatable annular element.

17. A bearing unit according to claim 1, wherein the radially inner annular element is an annular element (21) separate from the rotatable race (2b) of the bearing unit and is adapted for being mounted adjacent and fast for rotation to said rotatable race.

* * * * *